Patented June 7, 1949

2,472,422

UNITED STATES PATENT OFFICE 2,472,422

COCCIDIOSTATIC COMPOSITION

Paul D. Harwood, Ashland, Ohio, assignor to Dr. Hess & Clark, Inc., Ashland, Ohio, a corporation of Ohio No Drawing. Application August 21, 1946, Serial No. 692,128

4 Claims. (Cl. 167—53.1)

The present invention relates to a novel and useful method and means for combatting the condition called "coccidiosis," which is a disease complex of livestock and poultry caused by a group of closely related animal parasites known as "coccidia." One species of this genus, *Eimeria tenella*, which causes the cecal or bloody type of coccidiosis of fowls is responsible for the most extensive losses.

Numerous remedies for this condition have resulted from the extensive researches conducted by numerous investigators during the preceding decade. Although some of these remedies are useful, none has proved completely satisfactory. Sulfur, though cheap, is only partially effective and may prove toxic; the sulfone amides are effective in some instances but are too expensive for extensive use particularly in poultry husbandry; and the arsenicals, such as 3-nitro-4-hydroxy phenyl arsonic acid, must be used at concentrations dangerously close to the toxic levels.

A desideratum in this art is a coccidiostatic which is equal to or superior in effectiveness to the known coccidiostatics and which is free from the deficiencies and disadvantages thereof.

It has been found that this desideratum is essentially realized by the para-substituted nitrobenzenes, which have an excellent coccidiostatic action. This effectiveness of this class of chemical compounds was wholly unforeseeable and is suprising, particularly since the corresponding meta- and ortho-substituted isomers are but weakly coccidiostatic.

The new coccidiostatics according to the present invention correspond to the formula

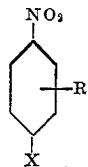

wherein X stands for any one of several radicals. Effective compounds include those wherein X is amino (—NH₂) or substituted amino

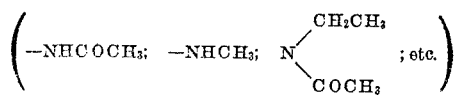

or the acetonitrile group. Particularly effective are those compounds wherein X is a chlorine (—Cl) or bromine (—Br) atom. R in the formula stands for hydrogen or simple substituents such as the phenyl group (—C₆H₅), the sulfonic acid group (—SO₃H) or the like which do not affect the therapeutic efficacy of the compound.

In the practical application of the invention, it is preferred to incorporate the coccidiostatic compound, i. e. the p-substituted nitrobenzene, into the feed of the fowls or animals to be treated. Because the molecular weights of the various new coccidiostatics vary considerably, the concentrations of the medicaments in the feed may vary within a range of commensurate width. However, best results have been obtained by using a concentration between 0.03 percent and 1 percent of the weight of the feed, and this is therefore the presently preferred range. The drug may be fed continuously, or feeding thereof may be commenced only at the first sign of an outbreak of the disease and continued for a week or so or until the afflicted animals have recovered.

In lieu of administering the coccidiostatic according to the invention in the feed, it may also be administered in the drinking water in those instances where the compound is sufficiently soluble. The concentrations used in the water are analogous to those used in the feed.

The following examples illustrate the invention:

EXAMPLE 1

Fifteen 39-day old chicks were given one million oocysts of the coccidian, *Eimeria tenella*. The thus-infected chicks were fed a composition consisting of the usual chick feed (mash) containing uniformly distributed therethrough 0.1 percent by weight of p-nitro-methylaniline. The chicks all safely survived the infection.

Of fifteen similar chickens, likewise infected but given no medication, 8 birds died of coccidiosis.

Of additional like batches of similarly infected chickens, whose feed contained 0.1 percent of nitroguanidine or 0.1 percent by weight of 3-nitro-4-acetylaminotoluene, respectively, 6 birds died in the one case and 12 birds in the other.

EXAMPLE 2

Fifteen 39-day old chicks were infected with 1,000,000 oocysts of the coccidian mentioned in Example 1. None of the thus-infected birds died, when they received 0.1 percent by weight of p-nitroethyl-acetanilide in their mash feed.

EXAMPLE 3

Each of two batches of fifteen 39-day old chicks were infected with 1,000,000 oocysts of the coccidian, *Eimeria tenella*. One batch was treated by being fed a mash feed containing 0.1 percent by weight of p-nitrophenylacetonitrile while the mash feed of the other contained a like percentage of p-nitrochlorobenzene. In the latter case, the feed following the first feeding contained only 0.05 percent of the coccidiostatic. None of the birds in the latter batch died, while only 3 birds in the first batch succumbed to the disease. 8 birds out of fifteen similarly infected controls died of coccidiosis.

The treatment is not restricted to chickens of any particular age nor, as aforesaid, need the percentage of medicament in the feed be precisely 0.1 percent by weight, the foregoing examples being only illustrative.

EXAMPLE 4

4.5 grams of p-nitroaniline-o-sulfonic acid were uniformly incorporated into 10 pounds of ordinary stock mash feed which was then fed to a pen of 14 chickens, about 10 days old. Four days later the chickens were severally infected with 50,000 sporulated oocysts. Twelve days later, all the chicks were normal and healthy while a similarly infected but untreated control group of 20 chicks suffered a loss of six by death of coccidiosis.

For another simultaneously and similarly treated group of 16 chicks, the 4.5 grams of p-nitroaniline-o-sulfonic acid were replaced by 4.5 grams of 4-nitro-4'-methyl-diphenyl amine. Only one chick was lost.

EXAMPLE 5

The following table shows the efficacy of equivalent moles of several coccidiostatic compounds according to the invention, against coccidiosis of chicks caused by *Eimeria tenella*. Each chick was infected with 56,000 sporulated oocysts at age 19 days. Treatment in cages 1–6 and 8 started four days before; in cage 9 treatment began on day of infection. The culture was manifestly very virulent, as indicated by the loss of 15 chicks in the control group (fed with ordinary mash feed—no coccidiostatic added). The other eight groups, treated according to the invention, suffered greatly reduced losses, the halogen-containing compounds proving particularly efficacious.

The method of testing the coccidiostatic activity of the compounds is essentially standardized. Susceptible birds are kept in wire floored cages; the birds are all infected simultaneously and treatment begun at some arbitrarily chosen time. The control chicks become sick in the fifth day after infection. Efficacy of treatments is judged by the difference in mortality between the control group and the treated groups.

Table

| Pen No. | Number of chickens in pens | Drug employed | Amount of drug in 10 lbs. of feed, (grams) | Mean weights of birds in grams, age— | | | | | Number of deaths |
|---|---|---|---|---|---|---|---|---|---|
| | | | | 15 days | 19 days | 23 days | 27 days | 31 days | |
| 1 | 20 | p-nitroacetanilide | 2.0 | 89.2 | 89.6 | 101.0 | 119.0 | 128.2 | 2 |
| 2 | 18 | p-nitroaniline | 1.53 | 85.6 | 89.3 | 101.2 | 114.2 | 131.4 | 6 |
| 3 | 19 | p-nitroethyl-acetanilide | 2.33 | 86.3 | 89.4 | 101.6 | 120.3 | 132.3 | 3 |
| 4 | 18 | p-nitromethyl-aniline | 1.69 | 91.4 | 96.4 | 111.2 | 125.2 | 141.2 | 7 |
| 5 | 16 | p-nitrobromo-benzene | 2.19 | 94.5 | 93.5 | 104.7 | 124.9 | 137.0 | 0 |
| 6 | 18 | p-nitrochloro-benzene | 1.76 | 93.4 | 106.1 | 119.6 | 130.7 | 145.3 | 0 |
| 7 | 19 | Control | 0.0 | 93.5 | 110.8 | 123.0 | 112.0 | 122.3 | 15 |
| 8 | 14 | 2-phenyl-4-nitro-acetanilide | 2.84 | 95.6 | 94.5 | 96.7 | 110.9 | 119.9 | 2 |
| 9 | 17 | p-nitrobromo-benzene | 2.19 | 98.7 | 126.8 | 120.8 | 121.5 | 133.1 | 4 |

Having thus disclosed the invention, what is claimed is:

1. A coccidiostatic composition for the prevention and treatment of coccidiosis in poultry which are exposed to the said disease, consisting essentially of a mash feed and between 0.03 and 1 percent by weight of a member of the group consisting of para-nitrochlorobenzene, para-nitrobromobenzene and para-nitroacetanilides.

2. A coccidiostatic composition for the prevention and treatment of coccidiosis in poultry which are exposed to the said disease, consisting essentially of a mash feed and between 0.03 and 1 percent by weight of para-nitrochlorobenzene.

3. A coccidiostatic composition for the prevention and treatment of coccidiosis in poultry which are exposed to the said disease, consisting essentially of a mash feed and between 0.03 and 1 percent by weight of a para-nitroacetanilide.

4. A coccidiostatic composition for the prevention and treatment of coccidiosis in poultry which are exposed to the said disease, consisting essentially of a mash feed and between 0.03 and 1 percent by weight of para-nitrobromobenzene.

PAUL D. HARWOOD.

REFERENCES CITED

The following references are of record in the file of this patent:

UNITED STATES PATENTS

| Number | Name | Date |
|---|---|---|
| 2,362,003 | Harwood | Nov. 7, 1944 |

OTHER REFERENCES

Harwood et al.—Journal of the American Veterinary Medical Association, vol. 97, Sept. 1940, page 250 (copy in Division 43).

Handbook of Chemistry and Physics (1944), 28th ed., pages 556, 557, 589, 591 (copy in Division 43).